Aug. 16, 1960   E. R. ZIEGLER   2,949,107
APPARATUS FOR DETERMINING THE VITALITY OF TEETH
Filed April 6, 1953   2 Sheets-Sheet 2

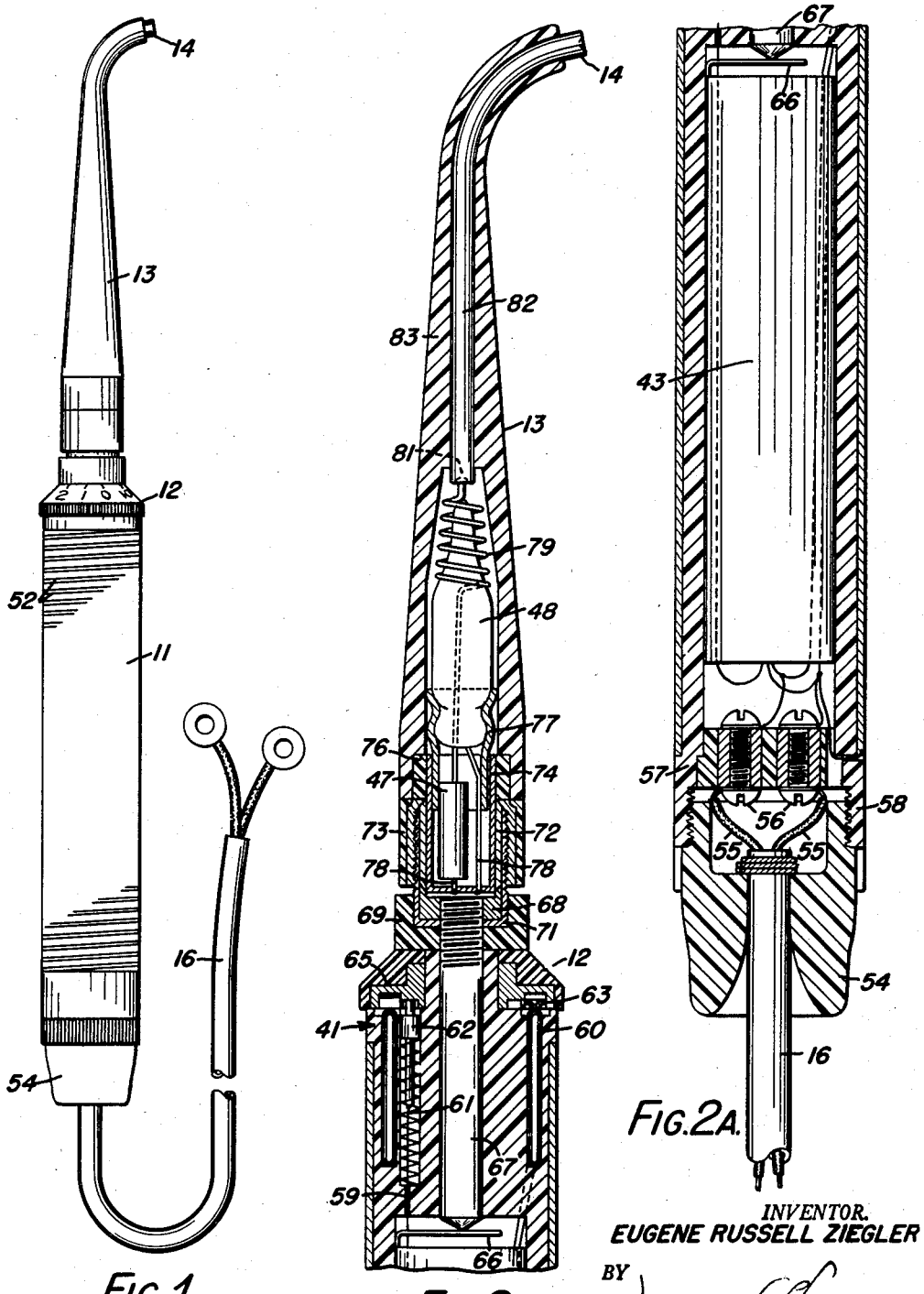

INVENTOR.
EUGENE RUSSELL ZIEGLER
BY
ATTORNEY

2,949,107
APPARATUS FOR DETERMINING THE VITALITY OF TEETH

Eugene Russell Ziegler, Spencerport, N.Y., assignor to Ritter Company, Inc., Rochester, N.Y., a corporation of Delaware Filed Apr. 6, 1953, Ser. No. 346,936

7 Claims. (Cl. 128—2.1)

My invention relates to an apparatus for testing the vitality of teeth more commonly termed in the art a "pulp tester."

In determining the vitality of a tooth, objective tests such as the application of heat, cold and percussion are of limited value and sometimes confusing. Very often the failure of the patient to respond to such tests may be interpreted as non-vitality of the pulp and this condition may not in fact exist. X-rays, although valuable and widely employed for revealing the state of the tooth, have limitations and are not always reliable as indicators of pulp vitality.

The limitations of subjective tests and X-rays and the inaccuracy of the results of their use in determining pulp vitality has led to the use of electrical pulp testers which have now been fairly well accepted by specialists. In general in such electrical pulp testers the criterion in determining the vitality or non-vitality of the pulp is the responses of the patient in relation to the amount of electrical potential applied to the tooth. In pulp testing the procedure is to apply an electrical potential to the external surface of the tooth through an electrode to affect flow of current through the tooth enamel and through the body of the patient to an electrode held in the hand of the patient. Suitable means are provided for increasing the potential to allow increasing current flow through the enamel until the patient experiences some pain. If there is no response by the patient when the potential is increased to a certain value the tooth is assumed to be non-vital. Numerous objections exist to this method of pulp testing. Among the foremost of these is that no current may be actually flowing in the pulp testing circuit because of the high resistance of the tooth enamel; the possibility that the patient may receive an electrical shock as a result of the relatively high voltage required for adequate testing (60 v. approx.); the fact that the patient is required to hold an electrode; and the fact that the dentist requires an attendant to control the voltage. These deficiencies have led to other efforts in the field of electrical pulp testing.

In general the new methods of pulp testing involve the use of high frequency waves or electrical impulses. While high frequency methods of pulp testing have eliminated many of the difficulties partly pointed out above, one of the objections which the new methods have not overcome is the necessity of the patient holding a hand electrode. While the use of hand electrodes in such high frequency systems is not in the least dangerous, the psychological effect on the patient is an important factor to be considered. Most people have a natural aversion to an electrical shock and the necessity of the patient holding an electrode immediately increases his uneasiness because he becomes aware that he in some manner is being subjected to electrical testing and may receive a shock. Moreover, and more important, such pulp testers in practical use require the aid of an assistant to operate the voltage control on the instrument and read the microamperes while the dentist applies the electrode to the tooth under observation. When the dentist has no attendant available, it is necessary for him to divide his attention. He must be certain of the proper application of the electrode to the tooth being tested and at the same time adjust the voltage and read the current flow through the pulp testing circuit, both of which are located in a control box separate and removed from the pulp electrode.

An object of my invention is to provide reliable apparatus which is convenient for the dentist to use by which the dentist can positively determine the vitality of a tooth.

Another object of my invention is to provide a self-contained unit which is held in the hand of the dentist, the unit including an electrode which is applied to the tooth and the unit further including a finger piece which may be adjusted to vary voltage and current flow through the pulp circuit without the dentist being required to remove his eyes from the tooth and the end of the tooth electrode.

A further object of my invention is to provide a pulp tester wherein the tooth is subjected to electrical impulses at high frequency at controlled voltages, the circuit through the tooth including a resistance and a light of the ionizable gas type in parallel whereby the patient is protected against unduly large electrical impulses at low voltage and the light only being illuminated and capable of passing current to any great extent at more elevated voltages whereby the dentist may gradually increase the current flow through the resistance to determine tooth vitality and thereafter assuming the response is negative, he may increase the voltage to illuminate the neon light to check the operativeness of the pulp tester.

My invention further contemplates apparatus for testing the vitality of teeth which includes a unitary light weight hand fitting casing which has incorporated therein a probe or tooth terminal; a visual thumb controlled current and voltage regulator which may be actuated without the dentist removing his eyes from the tooth being examined; and a visual means of determining without removing his eyes from the tooth under observation whether the apparatus is functioning correctly to give a true indication of tooth vitality, the hand fitting casing further including means whereby the circuit through the tooth is completed through the body of the patient and the dentist to the end that the necessity of the patient holding a hand electrode or other hand piece is avoided.

Other objects and advantages of my invention will be particularly set forth in the claims and will be apparent from the following description, when taken in connection with the accompanying drawings, in which:

Fig. 1 is a side external view of the unit of my invention for testing the vitality of teeth;

Fig. 2A is a longitudinal sectional view through the left hand end of the pulp tester as viewed in Fig. 1;

Fig. 2B is a continuation of Fig. 2A showing the right hand end of the pulp tester;

The apparatus for testing the vitality of teeth of my invention comprises a hand fitting barrel or casing 11, a finger or thumb controlled rotatable member 12 for regulating voltage and current flow, a casing extension 13 of diaphanous material and a probe or tooth terminal 14 adapted to be applied to the tooth under observation.

Figure 3:
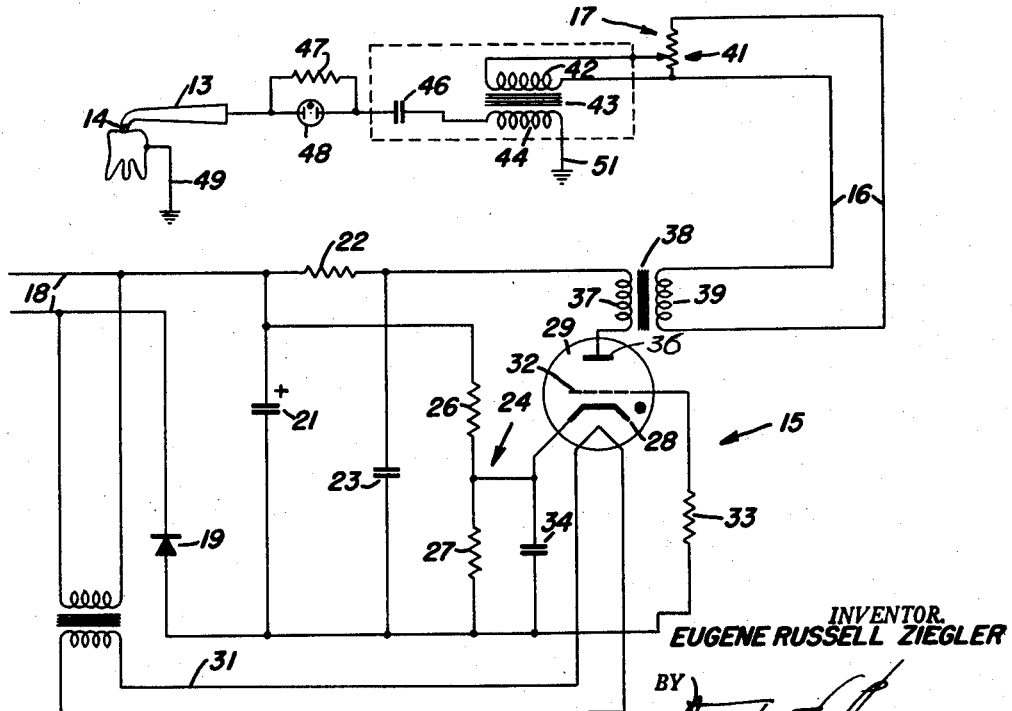
Fig. 3 is a circuit diagram illustrating the wave forming and rectifying circuits for generating electrical impulses for application to the tooth under observation.

The principles of the pulp testing apparatus of my invention may be made more clear by reference first to the circuit diagram of Fig. 3. That portion of the circuit which generates electrical impulses of a rapidly repeating nature is generally indicated by the numeral 15. This portion of the circuit, preferably located in a separate enclosure or box (not shown), is connected to a cord assembly 16 (Fig. 1). The cord assembly is connected to that portion of the circuit, generally indicated by the numeral 17, which controls the value of current flow through and the potential in the pulp testing circuit.

The circuit for generating electrical impulses of a rapidly repeating nature, indicated generally by the numeral 15, will be but briefly described since such circuits are well known and may be purchased from suppliers thereof as complete units. Alternating current power is supplied to the circuit from a source indicated at 18. This source of supply of alternating current on the negative half of the alternating wave rectifier 19 permits passage of current so that an electrical charge is built up in capacitor 21. The voltage built up in capacitor 21 approaches the maximum potential of the alternating current voltage supplied to the circuit. Essentially direct current flows through resistor 22 into capacitor 23. A voltage divider network, generally indicated by the numeral 24, and comprising resistors 26 and 27, applies an essentially constant potential to the cathode 28 of the electronic tube 29. A heater circuit 31 has been shown for the tube 29.

The electronic tube 29 is of the gas filled discharge type commonly called a thyratron tube. The grid 32 thereof is maintained at a potential below that of the cathode 28 by a resistor 33. Capacitor 34 connected between the resistor 33 and the cathode 28 maintains this potential difference essentially constant even though a fluctuating current flows through the resistor 27.

As is well known in the art, the operation of the thyratron tube is such that current will not flow from the plate 36 to the cathode 28 until a relatively high voltage has been built up on the plate. As previously mentioned, capacitor 23 gradually builds up voltage due to the current flow through resistor 22. This voltage is applied to the plate through the primary 37 of the transformer 38.

Figure 4A:
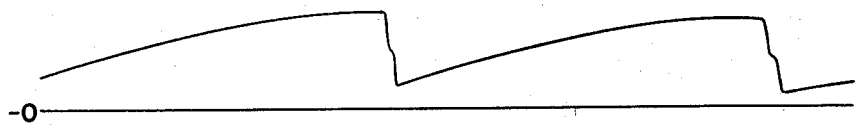
Figs. 4A to 4D inclusive are views showing the wave forms generated in various portions of the circuit shown in Fig. 3.
Figure 4B:
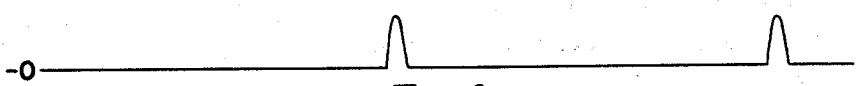

When the firing potential of the thyratron tube is reached, this tube conducts a large amount of current, the amount being limited primarily by the impedance of transformer 38. In Fig. 4A, I have indicated the wave form of the charge to the capacitor 23 and in Fig. 4B I have indicated the wave form of the discharge from the capacitor 23. Since the thyratron tube conducts a large amount of current once its firing potential has been reached, this flow of current rapidly removes the charge from capacitor 23, thus lowering the plate voltage to a potential so low that the tube stops conducting and generates a voltage rise and reversal in the secondary 39 of the transformer 38.

Figure 4C:
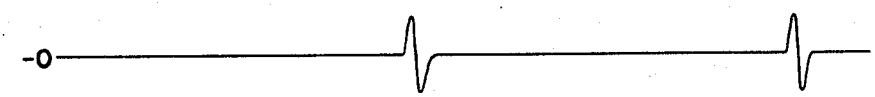
Figure 4D:
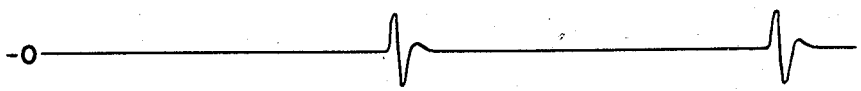

The voltage wave generated in the secondary 39 of the transformer 38 is transmitted by the flexible cable 16 to an adjustable potentiometer resistor generally indicated by the numeral 41. A selected proportion of this voltage is then applied to the primary 42 of a transformer 43. A corresponding voltage rise and reversal is thus generated in the secondary 44 of the transformer 43. Thus the wave form produced by the wave generator generally indicated by the numeral 15 is applied to the secondary 44 of the transformer 43 and, as will presently appear, is applied to the pulp testing circuit. The wave forms of the secondary 39 of transformer 38 and the secondary 44 of transformer 43 are shown in Figs. 4C and 4D respectively.

The voltage rise and reversal generated in the secondary 44 of the transformer 43 is transmitted through a capacitor 46 and a resistor 47 and a lamp 48. The lamp is of the ionizable gas type and constitutes a visible indicator to enable the dentist to determine readily whether the pulp tester is functioning properly. The current passing through the parallel arranged resistor 47 and neon lamp 48 flows to the tooth terminal or probe 14, the return path of current flow being partly indicated at 49 which is the ground connection provided by the patient. The return path of current flow further comprises a conducting ribbon 52 (Fig. 1) preferably of nichrome wound around the handle of the instrument and grounded by the dentist as indicated at 51 in Fig. 3.

The physical aspects of the portable assembly need not be described in detail since the invention will be clear from the circuit diagram above described and from the explanation which follows. The cord assembly 16 enters the portable handle through a ferrule 54 of insulating material and the wires 55 are attached to suitable insulated terminals as indicated at 56. The ferrule is threaded into a casing 57 of insulating material as shown at 58. Mounted internally of the casing 57 is the transformer 43 which is of the open core type. This transformer has not been shown in detail since the construction of such transformers is well known in the art. It is sufficient to state that the transformer comprises a core of soft iron wires around which is a helical coil of insulated wire which forms the primary winding. The secondary 44 of transformer 43 consisting of a large number of turns of fine wire, is then wound upon the primary. One lead from the terminals 56 passes to the primary of the transformer 43 and thence to the potentiometer while the other lead from the terminals 56 passes externally of the transformer and extends rearwardly through an opening 59 in the insulating casing 57 and is connected to a conducting spring 61. The conducting spring 61 exerts pressure on a potentiometer dial stop pin 62 of conducting metal. A metal conducting insert 65 in the dial 12 electrically connects pin 62 with the potentiometer 41.

The adjustable potentiometer has been indicated at 41 in Figs. 3 and 2B and includes the rotatable graduated control dial or knurled thumb piece 12. The dial 12 is calibrated on an arbitrary scale to indicate to the dentist relative voltage and current flow. The potentiometer 41 includes a flattened helically wound resistance strip 60 formed around the inside of the casing. A spring brush or sliding contact 63 is carried by the dial and as the dial is rotated, the potentiometer 41 varies the amount of current flowing to the primary 42 of the transformer 43. This varies the intensity of the current and the voltage being applied to the tooth as will presently appear.

The secondary of the transformer 43 is connected to the capacitor 46 (not shown in Fig. 2B). The capacitor terminal 66 engages a conductor 67 threaded into a member 68. The threaded end of the conducting member 67 is also adapted to receive an insulating member 69 which has a cavity for the reception of the member 68 and a threaded sleeve 71. A spring conducting member 72 longitudinally saw slotted is provided to which pressure may be applied by a threaded chuck element 73 when the chuck element is threaded on the sleeve 71. The slotted member 72 when pressure is applied, grips upon a sleeve 74 carried by a plug 76. The sleeve 74 supports a member 77 which carries the neon light 48.

The sleeve 74 is a conductor to which leads 78 are soldered. One of the leads 78 connects with the nearer end of the resistor 47. The other lead is one lead of the neon light 48. The other lead of the neon light and the lead from the far end of the resistor are both connected to the near end of the spring lead 79. The neon light 48 and the resistance 47 are thus mounted in parallel. The contact spring 79 is connected as shown at 81 to a conductor 82, the terminus of which is the tooth probe 14.

The tooth tester tip may comprise a casing 83 of acrylic plastic or other suitable translucent material. The words "translucent material" as herein used are intended to include any material, whether transparent or translucent, which will allow the passage of light to render the neon lamp visible when it is illuminated as will presently appear. In the manner described above, the tip including the neon lamp 48 and the resistance 47 may be removed from the handle by threading outward on the member 73 with respect to the member 71 thereby releasing the slotted member 72. A release of the slotted member releases the grip on the conducting sleeve 74.

In using the pulp tester, the dentist, after first setting the dial at zero, grasps the handle and applies the probe or terminal 14 to the tooth under observation. Preferably the dentist applies the probe first to a sound tooth and observes the position on the dial 12 at which the patient feels a sensation. This determines the approximate position of the dial 12 at which the patient should likewise receive a sensation when the terminal 14 is applied to the tooth under observation. With the probe applied to the tooth in question, the dial 12 is gradually rotated to increase the current flow through the primary 42 of transformer 43. During the application of the probe and the rotation of the potentiometer, the dentist applies his hand to a portion of the patient such as the face or neck and the circuit through the tooth is completed through the patient, through the dentist and the spirally wound Nichrome ribbon 52 wound on the barrel of the instrument. Thus both the patient and the dentist act as a conductor for the high frequency current used to excite the nerves in the tooth, if any. In the claims, I will not include that the circuit is completed by the dentist touching the patient as this is not essential. For at least reasonable results, the circuit may be completed through the air, assuming the dentist is close to the patient. However, most satisfactory results and better testing can, of course, be obtained by the dentist touching some portion of the person of the patient. The dentist need make no conscious effort of doing this since in most cases he has one hand grasping the instrument and the other hand on the face of the patient in any event.

One of the important aspects of my invention is that the dentist knows the approximate setting of the dial 12 at which the patient should receive a sensation. This he knows from past experience and from operating the instrument in connection with a sound tooth as previously mentioned. If the dentist finds that the patient receives no sensation, which the patient is instructed to indicate by raising his hand, the dentist then continues to rotate the dial 12 until the voltage applied is at a level of current flow and voltage which indicates to the dentist that the tooth is dead. At this level the voltage is sufficient to illuminate the neon light 48.

The characteristics of the neon light are such that it will transmit no appreciable current until a predetermined voltage is reached. Since the neon light does not pass any appreciable amount of current until a relatively high voltage is reached, substantially all current flow is through the relatively high resistance 47. By adjusting the dial of the potentiometer the current flow through the resistance 47 may be controlled in small increments. After the dial has reached a setting at which the patient should have received a sensation if the tooth pulp had vitality, the dentist continues rotating the dial until a response is indicated by the patient or the end of the dial is reached at which level the neon lamp will be illuminated. Failure of the lamp to become illuminated at a high setting of the dial indicates that the instrument is not functioning properly and the test of the tooth is therefore defective. However, if the neon lamp is illuminated, the dentist knows the instrument is functioning properly and that the tooth in fact lacks vitality.

An important aspect of my invention lies in the fact that the testing of a tooth may be performed without the necessity of having an attendant. Both the dial and the neon lamp are within the dentist's line of vision as he applies the probe to the tooth. The dentist may maintain his eyes on the tooth and manipulate the dial 12 with his thumb. The instrument is light in weight and easily grasped by the dentist and can be operated with little or no effort.

A further important aspect of my invention is the fact that the patient in many cases does not realize that he is being electrically tested. He is not required to hold an electrode or other hand piece since the high frequency circuit is completed through the patient, the external ribbon winding 52 on the barrel of the casing and the dentist. Due to the use of high frequency current, moreover, the patient during the examination feels only a slight sensation which upon the patient indicating such sensation demonstrates to the dentist that the tooth has vitality. Of course when the patient indicates a sensation, the dentist does not further rotate the dial to illuminate the neon lamp because he knows the instrument is working properly, the illumination of the lamp being performed only if the patient has not given an indication that he has received a sensation at normal levels of voltage and current flow.

While I have shown and described the preferred form of my invention, it will be apparent that various changes and modifications may be made therein, particularly in the form and relation of parts, without departing from the spirit of my invention as set forth in the appended claims.

I claim:

1. Apparatus for testing the vitality of teeth comprising, in combination, a source of high frequency current, a patient circuit, said patient circuit comprising, a casing adapted to be grasped by a dentist, an elongated element adapted to be applied to the tooth being tested detachably carried by said casing, and a light source mounted in said elongated element, means for connecting said source of current to said patient circuit, a variable potentiometer to vary the current flow through said circuit, said light source being of high resistance whereby it is illuminated and passes an appreciable amount of current only when the potential applied to it is at a value above that at which the vitalitiy of the tooth is determined.

2. An apparatus for testing the vitality of teeth comprising, in combination, a source of high frequency current, a patient circuit to which said high frequency current is passed, a casing in which at least part of said patient circuit is located, a casing extension of translucent material having conducting means including, as part of the patient circuit, a light of the ionizable gas type mounted therein and a tooth terminal at the end thereof, circuit means connecting said source to said patient circuit including a variable potentiometer for applying a variable voltage to said tooth terminal, and conducting means extending over the major part of the surface of said casing and constituting part of said patient circuit.

3. An apparatus in accordance with claim 2 in which the means for adjusting the potentiometer is a finger piece, said finger piece and light being positioned so that the dentist may observe the position of the finger piece and the condition of the light without removing his eyes from the tooth under observation.

4. An apparatus for determining the vitality of teeth comprising, in combination, a source of high frequency current, a patient circuit to which said high frequency current is passed, a casing in which at least part of said patient circuit is located, a casing extending of translucent material containing a portion of said patient circuit and a tooth terminal on the end thereof, circuit means connecting said source to said patient circuit including a variable potentiometer for applying a variable voltage to said tooth terminal, a conductor in said patient circuit adapted to be conveniently engaged by the hand of the dentist when he grasps the casing and means for varying the setting of said potentiometer, said means being a rotatable finger piece located at the forward end of said casing, said patient circuit including a light mounted in said translucent member enabling the dentist to observe simultaneously the light and the setting of the finger piece, and the tooth being tested.

5. Apparatus for testing the vitality of teeth comprising, in combination, a circuit for the generation of high frequency current, a casing, a patient circuit at least partly in the casing, a transfer circuit for passing the high frequency current to the patient circuit, a tooth terminal constituting part of the patient circuit at the end of said casing adapted to be applied to the tooth to be examined, conductor means on the exterior of the casing constituting part of said patient circuit, a light source of the ionizable gas type connected in series with said patient circuit for glowing at a predetermined current flow through said patient circuit for giving a reliable indication of the flow of current through the tooth being examined.

6. Apparatus for testing the vitality of teeth comprising, in combination, a circuit for the generation of high frequency current, a casing, a patient circuit at least partly in the casing, a transfer circuit for passing the high frequency current to the patient circuit, a tooth terminal constituting part of the patient circuit at the end of said casing and adapted to be applied to the tooth to be examined, conductor means on the exterior of the casing constituting part of said patient circuit, a potentiometer in one of said second two circuits, and finger control means adapted to be actuated by the dentist without removing his eyes from the tooth being examined for varying the resistance of said potentiometer, said patient circuit including a light source of the ionizable gas type and a resistance in parallel with the light source whereby as the finger control is moved to permit a larger volume of current to flow through said resistance to the tooth terminal, the response of the patient indicates the vitality of the tooth, said light source having resistance such that it is effective to permit current to flow sufficient to cause it to glow only at relatively high current values and voltages.

7. Apparatus for testing the vitality of teeth comprising, in combination, a circuit for the generation of high frequency current, a casing having conducting means extending over a major part of the surface, a patient circuit at least partly in the casing, means for passing the high frequency current to the patient circuit, a tooth terminal constituting part of the patient circuit, a conducting probe at the end of said casing adapted to be applied to the tooth to be examined, conductor means on the exterior of the casing constituting part of said patient circuit, variable resistance means adapted to vary the current flowing through said patient circuit, a light source of the ionizable gas type connected in series in said patient circuit for glowing at a predetermined current flow through said patient circuit for giving a reliable indication of the flow of current through the tooth being examined, a finger control for said variable resistance carried by said casing and adapted to be adjusted by the dentist to allow current through said patient circuit to be gradually increased until the patient reacts to the current flow or the dentist recognizes by the setting of the said control and the glowing of said light that the tooth lacks vitality.

References Cited in the file of this patent

UNITED STATES PATENTS

| | | |
|---|---|---|
| 1,242,778 | Darling | Oct. 9, 1917 |
| 1,548,184 | Cameron | Aug. 4, 1925 |
| 2,447,127 | Landauer | Aug. 17, 1948 |
| 2,522,052 | Logan et al. | Sept. 12, 1950 |
| 2,603,753 | Axelsson et al. | July 15, 1952 |